US009197344B2

(12) United States Patent
Cyzs et al.

(10) Patent No.: US 9,197,344 B2
(45) Date of Patent: Nov. 24, 2015

(54) SYSTEMS AND METHODS FOR REDUCING INTERFERENCE IN DATA COMMUNICATION NETWORKS

(71) Applicant: Ubiqam Ltd., Petach-Tikva (IL)

(72) Inventors: Baruch Cyzs, Kiryat-Motzkin (IL); Amir Meir, Tel-Aviv (IL); Oren Amidan, Tzur-Yigal (IL); Daniel Manor, Tel-Aviv (IL)

(73) Assignee: Ubiqam Ltd., Petach-Tikva (IL)

( * ) Notice: Subject to any disclaimer, the term of this patent is extended or adjusted under 35 U.S.C. 154(b) by 143 days.

(21) Appl. No.: 14/146,049

(22) Filed: Jan. 2, 2014

(65) Prior Publication Data

US 2014/0187276 A1 Jul. 3, 2014

Related U.S. Application Data

(60) Provisional application No. 61/748,176, filed on Jan. 2, 2013.

(51) Int. Cl.
*H04B 15/00* (2006.01)
*H04J 11/00* (2006.01)
*H04B 17/12* (2015.01)
*H04B 17/345* (2015.01)
*H04B 7/02* (2006.01)
*H04W 52/24* (2009.01)

(52) U.S. Cl.
CPC ............ *H04J 11/0023* (2013.01); *H04B 17/12* (2015.01); *H04B 17/345* (2015.01); *H04B 7/024* (2013.01); *H04W 52/243* (2013.01)

(58) Field of Classification Search
CPC .. H04W 52/243; H04W 72/082; H04W 16/14
USPC ............ 455/501, 67.11, 63.1, 63.2, 524, 525, 455/561, 561.1, 552.1, 553.1, 550.1, 455/436–444, 500, 517, 445, 426.1, 426.2, 455/422.1, 403, 571.1; 370/329, 236, 252, 370/328, 338
See application file for complete search history.

(56) References Cited

U.S. PATENT DOCUMENTS

2012/0071153 A1* 3/2012 Balachandran et al. ... 455/422.1

* cited by examiner

*Primary Examiner* — Keith Ferguson

(57) ABSTRACT

A computer-implemented method for calculating interference reducing parameters for cancelling wireless signal interference within a data communication network, comprising: per each of a plurality of antennas of a multi-sector hub communicating with a data communication network and with a corresponding transceiver of a plurality of distant transceivers: calculating a plurality of calibration factors based on values extracted from sequential transmission and reception of predetermined signals between each of the plurality of antennas of the multi-sector hub; calculating at least one receive interference cancellation parameter, to isolate desired signals transmitted by the corresponding distant transceiver from the undesired interference signals transmitted by other non-corresponding distant transceivers; calculating at least one transmit interference parameter for each non-corresponding antenna of the hub, based on the calculated receive interference cancellation parameters and the calibration factors; and generating the interference parameters for applying during operation of the multi-sector hub to generate interference cancellation signals.

23 Claims, 11 Drawing Sheets

SYSTEMS AND METHODS FOR REDUCING INTERFERENCE IN DATA COMMUNICATION NETWORKS

RELATED APPLICATION

This application claims the benefit of priority under 35 USC §119(e) of U.S. Provisional Patent Application No. 61/748,176 filed Jan. 2, 2013, the contents of which are incorporated herein by reference in their entirety.

FIELD AND BACKGROUND OF THE PRESENT INVENTION

The present invention, in some embodiments thereof, relates to data communication networks and, more particularly, but not exclusively, to systems and methods for reducing interference in data communication networks.

Wireless communication systems may contain links between a multi-sector transceiver communicating with other multiple transceivers (e.g., remote units). Interference may occur at the multi-sector transceiver, when multiple remote units transmit simultaneously to the multi-sector transceiver. Interference may also occur at each remote unit, when multiple sectors of the multi-sector transceiver transmit simultaneously.

Some possible solutions for sharing the communication resources to avoid or reduce interference include: partitioning the signals in time so that different transmitters transmit during dedicated time periods, using different frequencies for the different links, or using codes to differentiate the signals.

SUMMARY OF THE PRESENT INVENTION

An aspect of some embodiments of the present invention relates to systems and/or methods for cancelling out interference signals, to isolate a desired signal. Transmit interference cancellation parameters are calculated based on calibration factors and receive interference cancellation parameters. The transmit interference cancellation parameters are applied to outgoing signals, to reduce and/or avoid reception of the transmitted desired signal to receivers that are not intended to receive this signal, as such the pertinent actual transmitted desired signal is an interference to these receivers.

According to an aspect of some embodiments of the present invention there is provided a computer-implemented method for calculating interference reducing parameters for cancelling wireless signal interference within a data communication network, the method being carried out by a calibration unit programmed to carry out the steps of the method, which comprise: per each of a plurality of antennas of a multi-sector hub communicating with a data communication network and with a corresponding transceiver of a plurality of distant transceivers: calculating a plurality of calibration factors based on values extracted from sequential transmission and reception of predetermined signals between each of the plurality of antennas of the multi-sector hub; calculating at least one receive interference cancellation parameter, to isolate desired signals transmitted by the corresponding distant transceiver from the undesired interference signals transmitted by other non-corresponding distant transceivers; calculating at least one transmit interference parameter for each non-corresponding antenna of the hub, based on the calculated receive interference cancellation parameters and the calibration factors; and generating the interference parameters for applying during operation of the multi-sector hub to generate interference cancellation signals.

According to some embodiments of the present invention, the at least one transmit interference cancellation parameters are calculated from the at least one receive interference cancellation parameters by the equations:

$$F_{xy} = \frac{T_{secx} R_{secy}}{T_{secy} R_{secx}} \quad x \neq y$$

$$w_{xyt} = w_{yxr} F_{xy}$$

wherein:
$w_{xyt}$ denotes the transmit interference cancellation parameter for signals originating from antenna x and transmitted by antenna y;
$w_{yxr}$ denotes the receive interference cancellation parameter for signals originating from distant transceiver y and received by antenna x;
Fxy denotes the calibration factor relating $w_{xyt}$ and $w_{yxr}$;
Tsecx denotes the transfer function of the transmitting components of antenna x; and
Rsecy denotes the transfer function of the receiving components of antenna y.

According to some embodiments of the present invention, the method further comprises performing a calibration process at the multi-sector hub for determining the calibration factors for calculating the transmit interference cancellation parameter from the received interference cancellation parameter. Optionally, the calibration processes comprises: per each antenna of the multi-sector hub: transmitting a predefined signal from the respective antenna; receiving the transmitted predefined signal at other antennas; and calculating the calibration factors from relationships between the transmitted and received predetermined signals. Optionally, the calibration factor are calculated using the equations:

$$\left. \begin{array}{l} r_{xy} = pT_{secx} R_{secy} H_{yx} \\ r_{yx} = pT_{secy} R_{secx} H_{xy} \end{array} \right\} \quad F_{xy} = r_{xy}/r_{yx}; F_{yx} = r_{yx}/r_{xy}$$

wherein:
Fxy denotes the calibration factor;
P denotes the transmitted predefined signal;
$r_{xy}, r_{yx}$ denote the received predefined signal;
Rsec denotes the transfer function of the receiving component of the antenna;
Tsec denotes the transfer function of the transmitting component of the antenna; and
H denotes transfer functions of physical links between the different antennas.

Optionally, the calibration process is occasionally repeated during network operation to update the calibration factor. Optionally, the calibration process is performed at the multi-sector hub independently of the distant transceivers. Optionally, the method further comprises monitoring a remaining interference level at the multi-sector hub, and repeating the calibration process when the remaining interference level has increased above a predefined threshold.

According to some embodiments of the present invention, there are three distant transceivers and three antennas of the multi-sector hub, the receive interference cancellation parameter for signals transmitted by the second distant transceiver and received by the first antenna, is denoted by $w_{21r}$ and calculated by the equation:

$$w_{21r} = \frac{R_{sec1}}{R_{sec2}} \left( \frac{H_{23}H_{31} - H_{21}H_{33}}{H_{22}H_{33} - H_{23}H_{32}} \right);$$

wherein:

Rsec denotes the transfer function of the receiving components of antenna 1 or 2; and H denotes transfer functions of physical links between distant transceivers 2 or 3, and antennas 1 2 or 3.

According to an aspect of some embodiments of the present invention there is provided a system for cancelling interference within a communication network comprising: a multi-sector hub with a plurality of antennas for wireless communication; a plurality of distant transceivers, the hub antennas and corresponding distant transceivers arranged to form wireless data communication links within a data communication network, wherein signals transmitted by the distant transceivers overlap so that each hub antenna receives signals from the corresponding distant transceiver and at least one non-corresponding distant transceivers, and wherein signals transmitted by the hub antennas overlap so that each distant transceiver receives signals from the corresponding hub antenna and at least one non-corresponding hub antennas; a hardware processor in electrical communication with each multi-sector hub antenna; a non-transitory memory having stored thereon program modules for instruction execution by the hardware processor, comprising: modules for calibration: a module for receiving from the data communication network, a desired signal for wireless transmission by the respective antenna of the multi-sector hub; a module for calculating a plurality of calibration factors based on values extracted from transmission and reception of predetermined signals between each of the plurality of antennas of the multi-sector hub; a module for calculating at least one receive interference cancellation parameter, to isolate desired signals transmitted by the corresponding distant transceiver from the un-desired interference signals transmitted by other non-corresponding distant transceivers; a module for calculating at least one transmit interference parameter for each non-corresponding antenna of the hub, based on the calculated receive interference cancellation parameters and the calibration factors; modules for operation: a module for applying the calculated transmit interference cancellation parameters to the desired signal to generate interference cancellation signals for each of the other non-corresponding antennas; and a module for transmitting the desired signal by the corresponding antenna, and transmitting each interference cancellation signal by each of the other non-corresponding antennas, so that signals received by distant transceivers cancel out to isolate the desired signal.

According to some embodiments of the present invention, all processing for interference cancellation is performed by the processor in electrical communication with the antennas of the multi-sector hub.

According to some embodiments of the present invention, wireless links between the distant transceivers and multi-sector hub antennas operate at the same frequency, or at adjacent frequencies.

According to some embodiments of the present invention, the calibration factor is calculated based on properties of the components of the respective multi-sector hub antennas.

According to some embodiments of the present invention, the system further comprises one or more additional antennas per multi-sector hub, the plurality of antennas and distant transceivers arranged for multiple-input-multiple-output (MIMO) in a plurality of sectors, wherein signals generated by a subset of one or both of the plurality of antennas and distant transceivers interfere with each other, and wherein a module applies the calibration factors to cancel out signal interference between the plurality of antenna hubs and distant transceivers.

According to some embodiments of the present invention, the system further comprises one or more additional transceivers per distant transceiver, the hub antennas and plurality of distant transceivers arranged for multiple-input-multiple-output (MIMO) in a plurality of sectors, wherein signals generated by a subset of one or both of the plurality of antennas and distant transceivers interfere with each other, and wherein a module applies the calibration factors to cancel out signal interference between the plurality of antenna hubs and distant transceivers. Optionally, a calibration process for determining calibration factors for calculating the transmit interference cancellation parameters from the receive interference cancellation parameters, is run between each transmission antenna and each receiving antenna that receives interfering signals from other transmission antennas.

According to some embodiments of the present invention, the hub antennas and distant transceivers are arranged as sectors in a multi-point to single-point wireless backhaul for a Long Term Evolution (LTE) network.

According to some embodiments of the present invention, the hub antennas and distant transceivers are arranged as sectors in a multi-point to single-point wireless access network.

According to some embodiments of the present invention, interference cancellation is performed with N antennas of the multi-sector hub for N−1 distant transceiver interferers.

According to an aspect of some embodiments of the present invention there is provided a computer-implemented method for cancelling wireless signal interference within a data communication network, the method being carried out by an interference cancellation unit programmed to carry out the steps of the method, which comprise:

per each of a plurality of antennas of a multi-sector hub communicating with a data communication network and with a corresponding transceiver of a plurality of distant transceivers: receiving from the data communication network, a desired signal for wireless transmission by the respective antenna of the multi-sector hub;

applying transmit interference cancellation parameters to the desired signal to generate interference cancellation signals for each of the other non-corresponding antennas; and transmitting the desired signal by the corresponding antenna, and transmitting each interference cancellation signal by each of the other non-corresponding antennas, so that signals received by distant transceivers cancel out to isolate the desired signal; wherein: at least one transmit interference parameter for each non-corresponding antenna of the hub is based on receive interference cancellation parameters and calibration factors based on values extracted from sequential transmission and reception of predetermined signals between each of the plurality of antennas of the multi-sector hub, the receive interference cancellation parameters based on isolating desired signals transmitted by the corresponding distant transceiver from the un-desired interference signals transmitted by other non-corresponding distant transceivers.

According to some embodiments of the present invention, the method further comprises: receiving at the respective hub antenna desired signals transmitted by the corresponding distant transceiver of the plurality of distant transceivers and undesired signals interfering with the desired signals and transmitted by at least one other non-corresponding of the plurality of distant transceivers; applying receive interference cancellation parameters to cancel the interference from the signals transmitted by the at least one other non-corresponding of the plurality of distant transceivers to isolate the desired signals from the undesired signals; and providing the isolated desired signals for transmission within the data communication network. Optionally, each of the receive interference cancellation parameters are applied so that for each undesired signal transmitted by the other non-corresponding distant transceivers, and received by the plurality of hub antennas, the sum of the combination of the received signals having the applied receive interference cancellation parameters is minimized. Optionally, the receive interference cancellation parameters are weights applied to the received signals.

Unless otherwise defined, all technical and/or scientific terms used herein have the same meaning as commonly understood by one of ordinary skill in the art to which the present invention pertains. Although methods and materials similar or equivalent to those described herein can be used in the practice or testing of embodiments of the present invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the present invention can involve performing or completing selected tasks manually, automatically, or a combination thereof. Moreover, according to actual instrumentation and equipment of embodiments of the method and/or system of the present invention, several selected tasks could be implemented by hardware, by software or by firmware or by a combination thereof using an operating system.

For example, hardware for performing selected tasks according to embodiments of the present invention could be implemented as a chip or a circuit. As software, selected tasks according to embodiments of the present invention could be implemented as a plurality of software instructions being executed by a computer using any suitable operating system. In an exemplary embodiment of the present invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the present invention are herein described, by way of example only, with reference to the accompanying drawings. With specific reference now to the drawings in detail, it is stressed that the particulars shown are by way of example and for purposes of illustrative discussion of embodiments of the present invention. In this regard, the description taken with the drawings makes apparent to those skilled in the art how embodiments of the present invention may be practiced.

In the drawings.

DESCRIPTION OF SPECIFIC EMBODIMENTS OF THE PRESENT INVENTION

Figure 1:
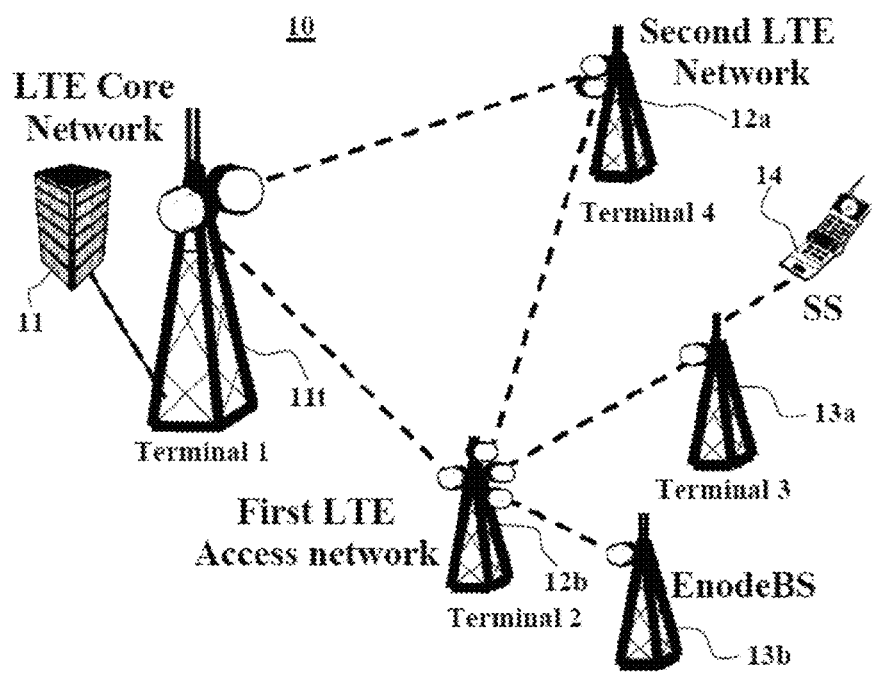
FIG. 1 is a schematic of an exemplary wireless communication network, useful in practicing some embodiments of the present invention.

The present invention, in some embodiments thereof, relates to data communication networks and, more particularly, but not exclusively, to systems and methods for reducing interference in data communication networks.

As used herein, the term transceiver means the ability to both receive and transmit wireless signals. The receiver and transmitter may be separate components (e.g., two antennas), or integrated into a single component (e.g., one antenna). The receiver and transmitter may be made from multiple sub-receivers and/or sub-transmitters, for example, a phased array.

An aspect of some embodiments of the present invention relates to systems and/or methods for calculating parameters to cancelling out interference signals, to isolate a desired signal. Transmit interference cancellation parameters are calculated based on calibration factors and receive interference cancellation parameters. The transmit interference cancellation parameters are applied to outgoing signals, to avoid reception of the transmitted signal to remote receivers that were not the target of the signal.

Interference cancellation may be required in architectures where hub multi-sector antennas have partial overlapping radiation patterns that cause the interference.

As used herein, the term corresponding means the receiver and transmitter that are arranged for communication with each another. For example, a specific multi-sector hub antenna with a specific distant transceiver. The antenna and distant transceiver may be arranged in a point-to-point (PTP) link.

As used herein, the term non-corresponding means one or more receivers and/or one or more transmitters that are not arranged for communication with each other. For example, antennas and/or distant transceivers that are not part of a specific PTP link. Transmitted desired signals within the PTP link that are received by antennas or distant transceivers that are not part of the PTP link are undesired interfering signals.

Optionally, calibration factors for calculating the transmit interference cancellation parameters are determined by a calibration process that may involve only a transmitting multi-sector hub. The hub contains multiple antennas. Each antenna is in communication with a corresponding distant transceiver. The calibration process includes transmission and reception of predefined signals within different antennas of the hub. The calibration process may not involve the corresponding distant transmitters. Optionally, the calculation of the calibration factors is performed independently of the corresponding distant transceivers. The calibration factors may be occasionally re-calculated to update the value of the calibration factors, for example, during predetermined times and/or when conditions change. In such a manner, the calibration process may be easier to implement and execute on a smaller number of units (only the hubs and not the hubs and distant transmitters).

Calculation of the calibration factors may not involve the distant transceivers. Calculation of the calibration factors may be performed independently by the hub without involvement from any of the distant transceivers. Calculation of the calibration factors may be performed by transmission from one hub antenna, and reception by the other hub antennas. Time-division duplexing (TDD) channel reciprocity between the hub antennas may be utilized for the calculation.

Optionally, transmit interference cancellation parameters are calculated for each non-corresponding hub antenna, based on calculated receive interference cancellation parameters and the calibration factors. The transmit interference cancellation parameters are applied to the desired signals to generate interference cancellation signals for each of the other non-corresponding antennas. The desired signal is transmitted by the corresponding antenna, and the interference cancellation signals are transmitted by the non-corresponding antennas. The signals received at the distant transceivers cancel out to isolate the desired signal transmitted by the corresponding antenna from the non-desired signals transmitted by the non-corresponding antennas.

An aspect of some embodiments of the present invention relates to systems and/or methods for cancelling out interference signals, to isolate a desired signal. The interference signals are cancelled based on the application of the transmit interference cancellation parameters, which were calculated based on calibration factors and receive interference cancellation parameters. The transmit interference cancellation parameters are applied to outgoing signals, to cancel out undesired signals to isolate desired signals.

The desired signals are transmitted from the distant transceiver to the corresponding antenna of the multi-sector hub. The desired signals are received together with undesired interfering signals at multiple multi-sector hub antennas (e.g., signals transmitted at the same frequency and/or same time). The signals received at the multiple multi-sector hub antennas are processed to cancel out the undesired interfering signals, to isolate the desired signals.

In such a manner, the interference may be intentional, as the allowed interference may increase capacity (e.g., bandwidth) of the system, for example, allowing simultaneous transmission using the same or adjacent frequencies, in adjacent overlapping links.

As used herein, the phrase interference cancellation means removal of excess noise and/or undesired signals to isolate a desired signal. Removal may not be complete. Noise and/or the undesired signals may remain at a reduced level that allows for isolation of the desired signal. The interference cancellation may reduce the level of noise, for example, below a predefined signal to noise ratio (SNR) threshold.

Optionally, interference cancellation is achieved by signal processing techniques. Additional hardware and/or changes to existing equipment may not be required.

As used herein, the term point-to-point (P2P) means an architecture of a single distant transceiver corresponding to a hub sector.

As used herein, the term point-to-multipoint (P2MP) means an architecture of multiple distant transceivers corresponding to a single hub transceiver by employing one or more access methods, for example, time division multiple access (TDMA), code division multiple access (CDMA) or orthogonal frequency division multiple access (OFDMA).

Optionally, multi-sector hub antennas and distant transceivers are arranged as corresponding pairs to form wireless data communication links within a data communication network. For example, the multi-sector hub antennas are arranged in a P2MP architecture with the corresponding distant transceivers. Each link between one multi-sector hub antenna and one corresponding distant transceiver may be a P2P link.

The distant transceivers may be, for example, access nodes for connecting end users. The multi-sector hub may be, for example, a tower with antennas for connecting the distant transceivers (e.g., access nodes) using microwave links. The multi-sector hub may connect to the network core, or may act as a relay to other towers.

Optionally, signals received at each multi-sector hub antenna contain a desired signal transmitted by a corresponding distant transceiver, and undesired interfering signals transmitted by at least one other non-corresponding distant transceiver. The undesired interfering signals received by the non-corresponding multi-sector hub antenna may be desired signals for a different corresponding multi-sector hub antenna.

Optionally, for each multi-sector hub antenna, one or more receive interference cancellation parameters are applied to cancel interference of signals transmitted by the non-corresponding distant transceivers. Optionally, the desired signal from the corresponding distant transceiver is isolated. Optionally, each desired signal from each corresponding distant transceiver is isolated for each corresponding multi-sector hub antenna. Optionally, the interference cancellation parameters are applied so that for each signal transmitted by the non-corresponding distant transceiver, and received by multiple multi-sector hub antennas (corresponding and non-corresponding), the sum power of the combination of the received signals having the applied interference cancellation parameters is minimal as possible, for example, approximately zero, and/or within a predefined tolerance range. Optionally, the receive and/or transmit interference cancellation parameters are weights. Optionally, the combinations are linear equations.

Optionally, co-channel interference of links between the multi-sector hub antennas and different distant transceivers is reduced and/or cancelled out. The cancellation of interference may allow lower frequency reuse rates than would be possible without the interference cancellation. The different links may use the same frequency (e.g., frequency reuse of 1). Alternatively or additionally, adjacent channel interference between the links is cancelled out. The different links may use higher power than would be possible without the interference cancellation. When the multi-sector hubs and distant transceivers are arranged as cells, interference may be cancelled out between cells (intercell) and/or within cells (intracell).

The multi-sector hub antennas may be in communication with multiple distant transceivers. Different multi-sector hub antennas may be used for each sector. Interference at the multi-sector hub antennas may be due to two or more distant transceivers transmitting signals to the multi-sector hub at the same time. Signals destined for one multi-sector hub antenna may be received by different antennas, causing interference with distant transceiver signals destined for that antenna. For example, in the case of a multi-sector hub with three antennas, each communicating with a different sector, the first distant transceiver transmission to the first antenna may also be received by the second and third antennas of the multi-sector hubs. The second distant transceiver transmission to the second hub antenna may also be received by the first and third hub antennas. The third distant transceiver transmission to the third hub antenna may also be received by the first and second hub antennas. Signals from the non-corresponding distant transceivers interfere with signals from the corresponding sector. Optionally, the desired signals from each corresponding distant transceiver are isolated for each multi-sector hub antenna.

Transmission from one multi-sector hub antenna to the corresponding distant transceiver may interfere with signals transmitted from other multi-sector hub antennas to other distant transceivers. For example, the first multi-sector hub antenna transmits to the first sector. Transmission by the second multi-sector hub antenna to the second distant transceiver may interfere with the first transmission, as the first distant transceiver may receive signals from the second multi-sector hub antenna. Transmission by the third multi-sector hub antenna to the third distant transceiver may also interfere with the first transmission, as the first distant transceiver may receive signals from the third antenna. Optionally, the signals are adapted at the multi-sector hub (before and/or during transmission) so that interference due to signals not destined for the corresponding distant transceiver are cancelled out. Optionally, the non-desired signals are cancelled out, isolating the desired signals for the corresponding sector.

It is noted that all antennas do not necessarily interfere with all distant transceivers, and/or that all distant transceivers do not necessarily interfere with all antennas. Some examples described herein refer to the case where all distant transceivers and all antennas interfere with each other. However, it should be understood that the methods, systems, equations and/or diagrams described herein may be modified to other cases where some antennas interfere with some distant transceivers, and/or some distant transceivers interfere with some antennas. For example, the antennas may be directional antennas, and the distant transceivers may be far from each other, so that one antenna may not interfere with all distant transceivers.

For purposes of better understanding some embodiments of the present invention, as illustrated in FIGS. 2-11 of the drawings, reference is first made to the construction and operation of a network 10, for example, an exemplary Long Term Evolution (LTE) backhaul wireless transmission network, as illustrated in FIG. 1. An LTE backhaul network core (e.g., wired) 11 is in electrical communication with one or more antennas 11t, which are in wireless communication with one or more other antennas 12a 12b. Antennas 12a and 12b may be relaying base stations. Antennas 12a 12b may divide the network into two access networks, for example, a First LTE Access Network and a Second LTE Access Network. Antenna 12b may be in electrical communication with one or more base stations (e.g., EnodeBS) 13a 13b, which provide connectivity to an end user 14, for example, a mobile phone, a Smartphone, a laptop, a tablet, or other devices.

Communication between antenna towers 11t, 12a, 12b, 13a and/or 13b may be provided by wireless links, for example, microwave links. Interference may occur in such network configurations. For example, when the interferer transmitter antenna boresight is steered towards the interfered receiving antenna, and/or when the interfered receiving antenna boresight is steered towards the interferer transmitting antenna.

Before explaining at least one embodiment of the present invention in detail, it is to be understood that the present invention is not necessarily limited in its application to the details of construction and the arrangement of the components and/or methods set forth in the following description and/or illustrated in the drawings and/or the Examples. The present invention is capable of other embodiments or of being practiced or carried out in various ways.

Figure 2:
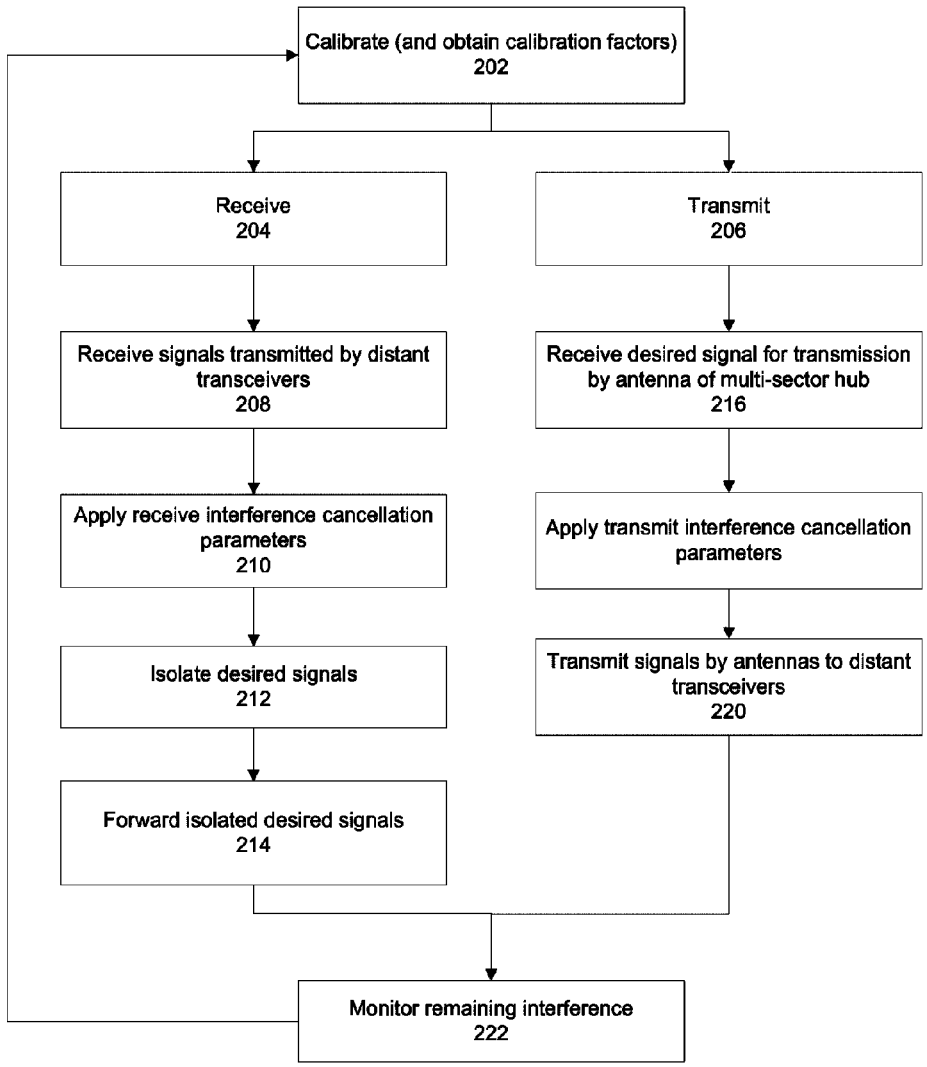
FIG. 2 is a flow chart of a computer-implemented method for cancelling interference between wireless links, in accordance with some embodiments of the present invention.
Figure 3:
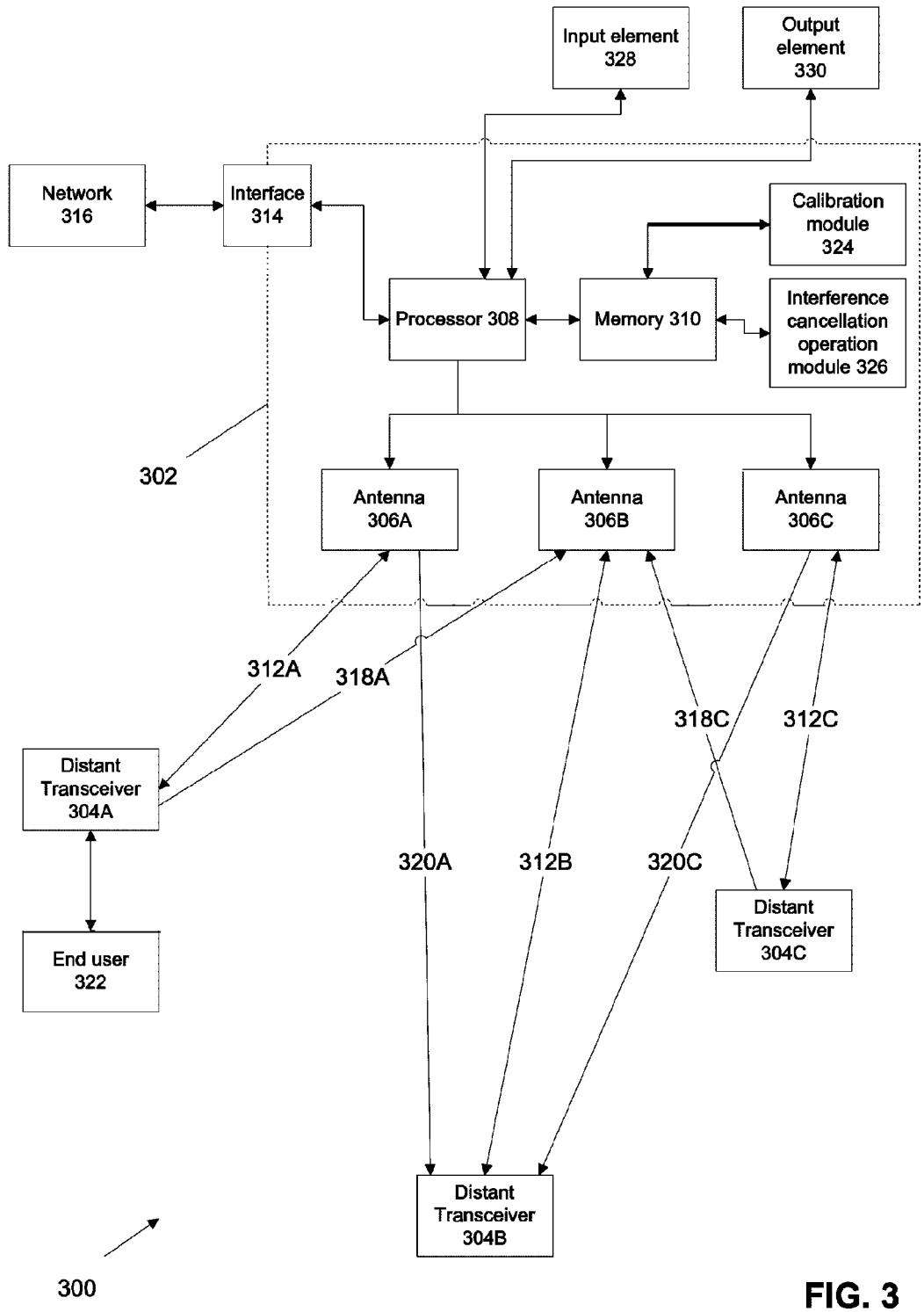
FIG. 3 is a block diagram of a system for cancelling interference between wireless links, in accordance with some embodiments of the present invention.

Referring now to the drawings, FIG. 2 is a computer-implemented flowchart method of cancelling undesired interference signals to isolate a desired signal, in accordance with some embodiments of the present invention. Reference is also made to FIG. 3, which is a block diagram of a system 300 for cancelling undesired interference signals to isolate a desired signal, in accordance with some embodiments of the present invention. The method of FIG. 2 may be performed by system 300 of FIG. 3. The method and/or system may increase utilization of existing network equipment and/or licensed frequency bands. The increased utilization may allow for additional network traffic, additional users to access the network, and/or provide for increased revenues.

Optionally, the method and/or system enable simultaneous usage of the communication resources (e.g., different wireless links, among sectors), for example, multiple distant transceivers may transmit simultaneously to a single multi-sector hub, or a single multi-sector hub may transmit simultaneously to multiple distant transceivers. Optionally, transmitted signals are not partitioned.

The interference cancellation method may improve frequency reuse, for example, in radio communication systems arranged as several PTPlinks that share the same tower. Optionally, all terminals (e.g., antennas) within the tower (e.g., hub) are embedded into a single unit.

Optionally, interference due to crossing lobes is cancelled.

Optionally, the interference cancellation method is employed for mutual co-channel and/or adjacent channel interference rejection.

System 300 comprises a multi-sector hub 302 in wireless communication with multiple distant transceivers 304A-C. The single multi-sector hub to three-sector configuration is exemplary. It should be understood that system 300 may contain multiple multi-sector hubs and/or other number of distant transceivers, with communication between multi-sector hubs and/or between distant transceivers.

Hub 302 contains three antennas 306A-C for forming links 312A-C with distant transmitters 304A-C, for example, microwave links. Desired signals may be transmitted using links 312A-C. Antennas 306A-C may be three separate elements, for example, three sector antennas. Alternatively or additionally, some or all antennas 306A-C are integrated into a single structure. Hub 302 may contain other numbers of antennas, for example, 1, 2, 4, 5, 6, or more antennas.

Optionally, links 312A-C are PTP links. Optionally, each link 312A-C has dual direction communication capabilities, operating in half or full duplex. Full duplex may be emulated by dividing the communication medium for forward and reverse communication. Examples of duplexing modes includes: time-division duplexing (TDD), and frequency-division duplexing (FDD). Data may be encoded on multiple carrier frequencies, for example, using orthogonal frequency-division multiplexing (OFDM). Alternatively, single carrier links may be utilized. The interference cancellation method may be performed in systems utilizing any of the aforementioned data transfer methods and/or modes, or other methods and/or modes.

Optionally, some or all PTP links 312A-C share the same frequency channel(s). Alternatively or additionally, some or all links 312A-C use adjacent frequency channels.

Optionally, there are one or more additional antennas per multi-sector hub. The antennas and distant transceivers may be arranged for multiple-input-multiple-output (MIMO) in multiple sectors. Alternatively or additionally, there are one or more additional transceivers per distant transceiver. The hub antennas and distant transceivers may be arranged for MIMO in sectors. Signals generated by a subset of one or both of the antennas and distant transceivers may interfere with each other. Cancellation of signal interference between the multiple antennas and distant transceivers may be based on the calibration factors.

Distant transceivers 304A-C may provide network access services to end users 322 (e.g., mobile devices), and/or may communicate with other transceivers (e.g., acting as relays).

Figure 11:
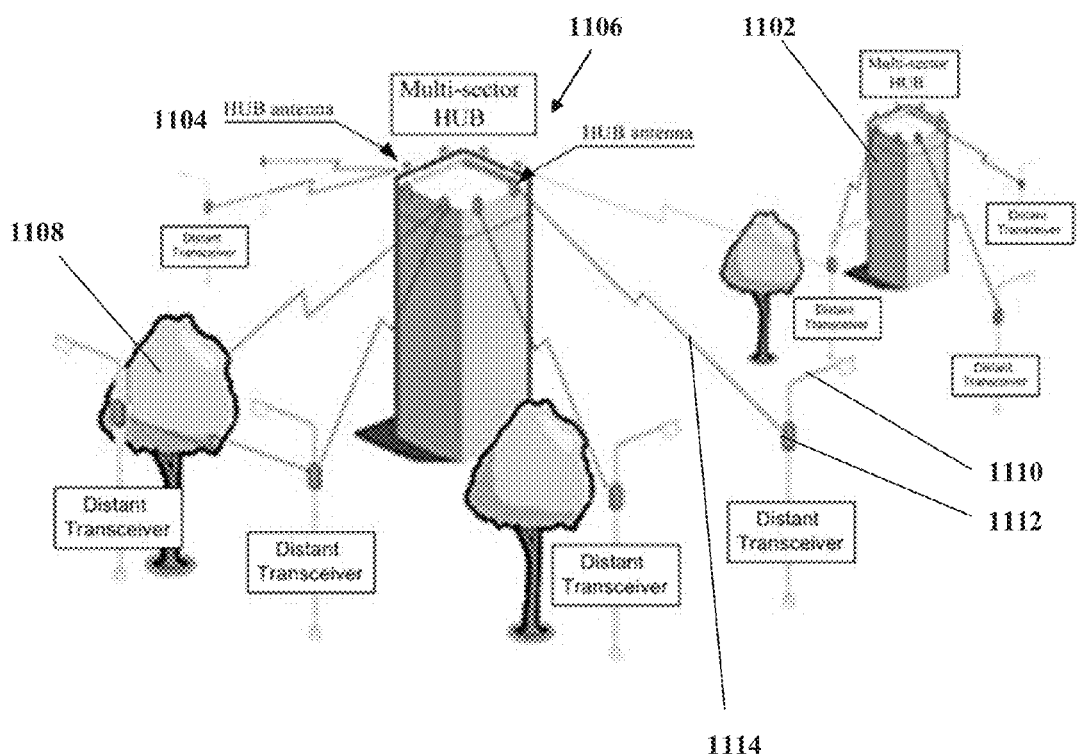
FIG. 11 is an illustration of an exemplary deployment environment of the system of FIG. 3, in accordance with some embodiments of the present invention.

Reference is now made to FIG. 11, which is an exemplary illustration of a deployment environment of the system of FIG. 3, in accordance with some embodiments of the present invention. Multi-sector hub 1106 comprises multiple antennas 1104 located on a high-rise building 1102, tower, hill, or other tall structures. Each hub antenna 1104 forms a communication link 1114 with a corresponding distant transceiver 1112, which may be located on a street light 1110, tree 1108, house, dedicated tower, or other structures.

Optionally, multi-sector hub 302 contains a hardware processor 308 in electrical communication with one or more antennas 306A-C, and/or with equipment connected to antennas 306A-C. Alternatively or additionally, processing is performed at a location remote to multi-sector hub 302, for example, by a remote processor communicating with multi-sector hub 302 using the network.

Processor 308 is in electrical communication with one or more non-transitory memories 310 storing one or more program modules and/or datasets containing instructions for execution by processor 308. Optionally, an interference cancellation operation module 326 is programmed to perform one or more of the method blocks of FIG. 2.

Optionally, multi-sector hub 302 has an interface 314 for connection to a data communication network 316, for example, the backhaul core network, such as an LTE backhaul network.

Optionally, the hub antennas and distant transceivers are arranged as sectors in a multi-point to single-point wireless access network.

Optionally, the processing for cancellation of interfering signals is performed at multi-sector hub 302. Optionally, processing is performed independently of the distant transceivers. For example, dedicated feedback and/or other information from the distant transceivers may not be required. Additional transceivers, antennas and/or dedicated antennas may not be required for the interference cancellation.

Optionally, system 300 is in electrical communication with one or more input elements 328 for a user to enter input into processor 308, for example, a touchscreen, a keyboard, a mouse, voice recognition, and/or other elements.

Optionally, system 300 is in electrical communication with one or more output elements 330 for a user to view data from processor 308, for example, a screen, a mobile device (e.g., Smartphone), a printer, a laptop, a remote computer, or other devices. Output element 300 may be used, for example, to view system performance, to upgrade software, to view configurations, and/or to debug the system.

The interference cancellation may be simple to implement, as only multi-sector hubs may need upgrading. The number of multi-sector hubs may be significantly less than the number of distant transceivers.

The interference cancellation may be sold, for example, as a box that plugs into hardware at the multi-sector hub site, and/or as software loaded at the multi-sector hub site. For example, an interference reduction unit programmed to carry out the steps of the method of FIG. 2 is sold. The interference cancellation unit may comprise modules 324 and/or 326, for example, sold as a computer program product on one or more non-transitory computer-readable storage media. The interference cancellation unit may also comprise memory 310 and/or processor 308, for example, sold as the box.

Optionally, one or more method blocks are implemented in a hybrid mode, for example, the calibration process and/or the interference cancellation process are implemented in software and/or in hardware.

Optionally, the method and/or system is used to reduce degree of freedom of N receiving antennas (e.g., rather than N+1). The reduction may be obtained by use of directional antennas. Each directional antenna may steer its boresight to different direction angles, while maintaining the level of overlap between the bounded antenna lobes (Steering N-1 nulls may require N antennas. In order to steer N-1 nulls and the maximum beam (e.g., main lobe) to the desired signal, N+1 antennas may need to point the beam toward the desired remote terminal). In an arrangement of N antennas, the null may be steered, without accurate prediction of the reception of the desired signal. For partial overlapping antenna lobes, degradation may be marginal or negligible. Therefore, with partial overlapping lobes, N antennas may be used to cancel N-1 interferers.

Optionally, system 300 comprises N antennas to cancel interference from N-1 distant transmitters. Optionally, the lobes of the antennas overlap. Alternatively, the lobes do not overlap. Alternatively or additionally, the lobes of at least some of distant transmitters overlap.

Optionally, N antennas are used within the multi-sector hub, instead of, for example, N+1 antennas.

Optionally, at 202, a calibration process is run. The calibration process may be performed as an initialization of system variables, and/or to update system variables, for example, as system variables change, such as due to weather or aging.

Optionally, one or more calibration factors are determined during the calibration process. The calibration factors may be evaluated based on transmission and reception of predetermined signals between the antennas of the hub.

Optionally, the calibration process is executed at the hub. Optionally, the calibration process is not executed at any of the distant transceivers, and may not involve the distant transceivers, for example, dedicated signals may not be required from the distant transceivers.

Alternatively or additionally, the calibration process measures and/or calculates one or more system variables utilized for interference cancellation, for example, transfer functions (of the channels, receivers, and/or transceivers), or other variables described herein.

Optionally, transmit interference cancellation parameters that are applied during signal transmission by the antennas of the multi-sector hub are derived from receive interference cancellation parameters that are applied during reception of signals sent by the distant transceivers and received at the multi-sector hub antennas. Information from the distant transceivers (other than the received signals) may not be required for the derivation process.

Reference is now made to the operation of the system, in order to provide context to help understand the calibration process. Additional details of the calibration process are described, for example, with reference to FIG. 7.

Referring back to FIG. 2, optionally, at 204, signals are received by multi-sector hub 302 (e.g., uplink). Alternatively, at 206, signals are processed and transmitted by multi-sector hub 302 (e.g., downlink).

Referring back to FIG. 3, optionally, signals are processed for interference cancellation in an uplink, for received signals travelling in a direction from end user 322 to network 316, for example, at the receiving element of multi-sector hub 302. Alternatively or additionally, signals are processed for interference cancellation in a downlink, for example, transmit signals travelling in a direction from network 316 to end user 322, for example, at the transmitting element of multi-sector hub 302. The transmitting and receiving elements may be integrated as one of antennas 306A-C.

Some undesired interfering signals 318A, 318C and 320A-C are illustrated to help in conceptually understanding the interference paths. Interference between distant transceiver 304B and multi-sector hub antenna 306B is described, and it is noted that the described interference may occur on any link between a multi-sector hub and corresponding distant transceiver. In the uplink, multi-sector hub antenna 306B receives the desired link signals 312B from distant transceiver 304B. Multi-sector hub antenna 306B may also receive undesired interference signals 318A from distant transceiver 304A, and/or undesired interference signals 318C from distant transceiver 304C. In the downlink, multi-sector hub 306B transmits desired signals over link 312B to distant transceiver 304B. Distant transceiver 304B may also receive interference signals transmitted by multi-sector hub antenna 306A (shown as 320A) and/or multi-sector hub antenna 306C (shown as 320C).

The interference described in the previous paragraph is not limited to a multi-sector hub with 3 antennas communicating with 3 different distant transceivers, but may be applicable to a multi-sector hub with N antennas communicating with N different distant transceivers. The multi-sector hub may introduce up to N−1 interferers to each of the distant receivers. The multi-sector hub with N antennas may face interference from up to N−1 distant transmitters.

Optionally, processing is performed so that signals received using N antennas cancel N−1 interfering signals. More than N antennas may not be needed. Alternatively, more than N antennas are used, for example, N+1, N+2. The additional antennas may cancel the interfering signals without hampering the desired signal.

Figure 4:
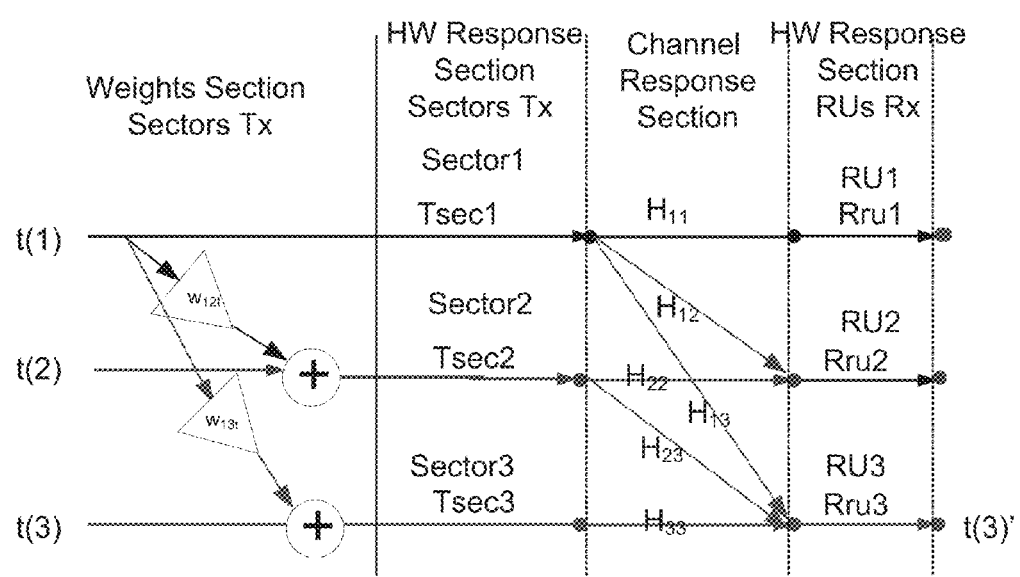
FIG. 4 is an exemplary diagram illustrating the downlink cancellation path for cancelling transmission from a certain antenna of a multi-sector hub to a corresponding distant transceiver, in accordance with some embodiments of the present invention.

Attention is now diverted to FIG. 4, which is a diagram illustrating the downlink cancellation path for cancelling transmission from a certain antenna (SEC) of multi-sector hub 302 (e.g., one of antennas 306A-C) to a corresponding distant transceivers such as a remote unit (RU) or distant transceiver (e.g., one of 304A-C), in accordance with some embodiments of the present invention. For clarity and illustrative purposes, the drawing denotes an architecture of a single multi-sector hub communicating with 3 distant transceivers (as illustrated in FIG. 3), however, the method may be utilized for architectures with other number of distant transceivers and/or other number of distant transceivers per multi-sector hub and/or other number of multi-sector hubs. The drawing denotes interference by transmission from SEC1 to RU3. Transmissions other than SEC1 to RU1, SEC2 to RU2, and SEC3 to RU3 interfere. In this example, SEC1 to RU3 interferes with the SEC3 to RU3 transmission.

The diagram helps to conceptually illustrate the modifications to the signal during transmission from the multi-sector hub antennas (SECs) to the distant transceivers (RUs). Optionally, before transmission, cancellation weights are applied to the signals, for example, by signal processing techniques (e.g., hardware and/or software). W12t denotes the weight applied to undesired interference signals from SEC1 to RU2. W13t denotes the weight applied to undesired interference signals from SEC1 to RU3. Optionally, the transmitted signals are further adapted by the transmission hardware equipment, for example, by the radio frequency (RF) chains of the transmitter (i.e., *HW Response Section Sectors Tx*). Tsec1, Tsec2, and Tsec3 denote the transfer functions for the corresponding transmitter RF chains. Optionally, the transmitted signals are further adapted by the channel medium (e.g., air, clouds, rain). H11, H12, H22, H13, H23, H33 denote the complex transfer functions of the physical channel between respective SECs and RUs, including the antenna response and/or the wireless channel responses. Optionally, the transmitted signals are further adapted by the receiving hardware equipment at each RU (i.e., *HW Response Section RUs Rx*). Rru1, Rru2, and Rru3 denote the transfer functions for the corresponding RU receiving RF chain.

Figure 5:
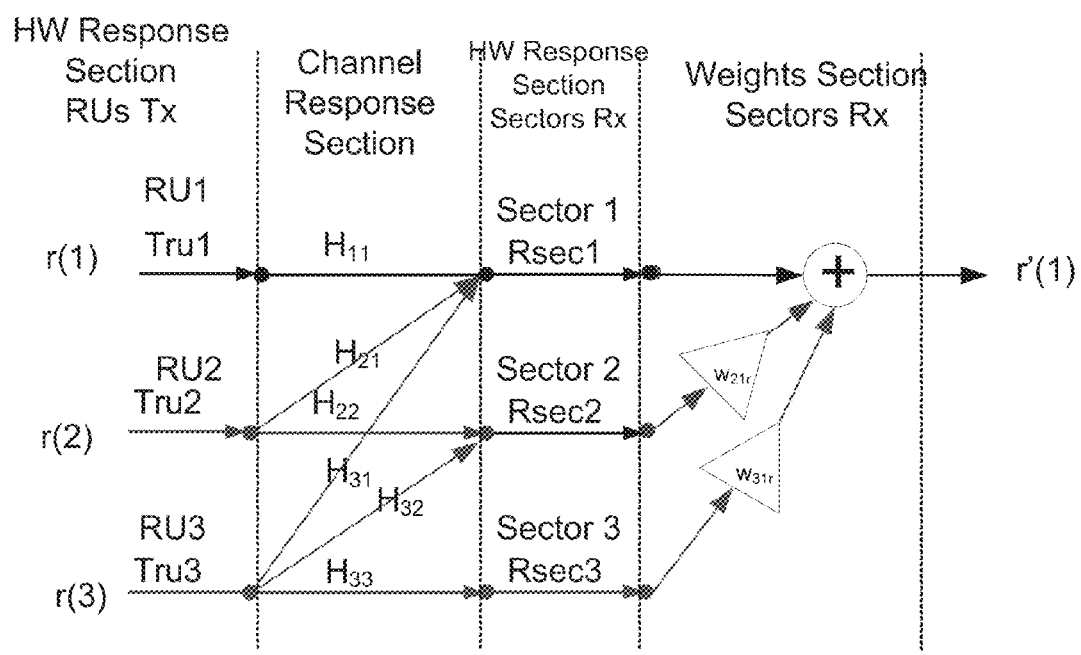
FIG. 5 is an exemplary diagram illustrating the uplink cancellation path for cancelling transmission from a certain distant transceiver to a corresponding multi-sector hub antenna, in accordance with some embodiments of the present invention.

Attention is also diverted to FIG. 5, which is a diagram illustrating the uplink cancellation path for cancelling transmission from a certain RU to the corresponding antenna of the multi-sector hub SEC, in accordance with some embodiments of the present invention. The drawing denotes interference from transmissions from RU2 to SEC1 and RU3 to SEC1, with the desired signals from RU1 to SEC1.

The diagram helps to conceptually illustrate the modifications to the signal during transmission from the distant transceivers (RUs) to the multi-sector hub (SECs). Optionally, the signal is modified by the transmitting hardware equipment at the RU, by the channel and/or by the receiving hardware at the SEC. The corresponding transfer functions are represented by Tru, H, and Rsec. Tru denotes the transfer function of the transmission RF chain of the distant transmitter. H denotes the channel transfer function from the distant transmitter to the hub receiver, including the antennas response at both link edges.

Referring back to FIG. 2, following the sub-flow chart of receive 204, at 208 signals sent by distant transceivers are received at the multi-sector hub. Optionally, signals sent by one distant transceiver to the corresponding antenna of the multi-sector hub are received by antennas paired with other distant transceivers. The signals from the other distant transceivers interfere with the desired signal from the paired sector. For example, with reference to FIG. 3, signals sent by distant transceiver 304B are received at antenna 306B, and interference signals are received at antenna 306A and/or 306C.

Optionally, some or all distant transceivers transmit simultaneously, so that each antenna of the multi-sector hub receives interference from non-corresponding distant transceivers.

At 210, one or more interference reducing parameters are applied to the received signals.

Optionally, the interference reducing parameters are weights.

Optionally, the weights are applied to one or more combinations of the received signals to perform the cancellation. Optionally, the combination contains received and transmitted signals. Optionally, transfer functions of the transmitting hardware, the channel and/or the receiving hardware serve for calculation the coefficients to the weights. Optionally, a dataset is constructed so that the interfering signals are cancelled. For example, a system of equations is solved, a matrix is constructed, or other data structures are used.

For example, with reference to FIG. 3, for communication link 312B between distant transceiver 304B and multi-sector hub antenna 306B, signals from distant transceiver 304A received at 306B and/or signals from distant transceiver 304C received at 306B are cancelled in order to isolate desired signal from 304B.

Optionally, weights are applied to signals sent by non-corresponding distant transceivers 304A and/or 304C received at antennas 306A, 306B and/or 306C to cancel out the non-desired transmitted signals.

The equations below illustrate exemplary derivation of transmission cancellation weights based on the receiving cancellation weights and/or parameters (e.g., Complex factor of transmission weights based on the receiver weights) that may be applied to cancel transmission interference. For clarity, reference is made to FIG. 5. The equations are derived for the exemplary case of desired signals from RU1 to SEC1, and removal of interference signals from RU2 to SEC1 and RU3 to SEC1. The RUs denote different distant transceivers. The SECs denote different antennas of the multi-sector hub.

Optionally, calculation of the receive interference cancellation weights is performed using methods of interference cancellation, for example, least mean square (LMS) algorithm, minimum mean square error (MMSE), the Wiener method, or other methods, such as methods that perform zero-forcing weight calculations directly from channel estimation.

Some equations below describe one optional method of calculating receive interference cancellation weights from channel parameters. The equations may help in understanding the calibration process and/or calculation of transmit interference cancellation parameters based on the receive interference cancellation parameters.

Figure 6:
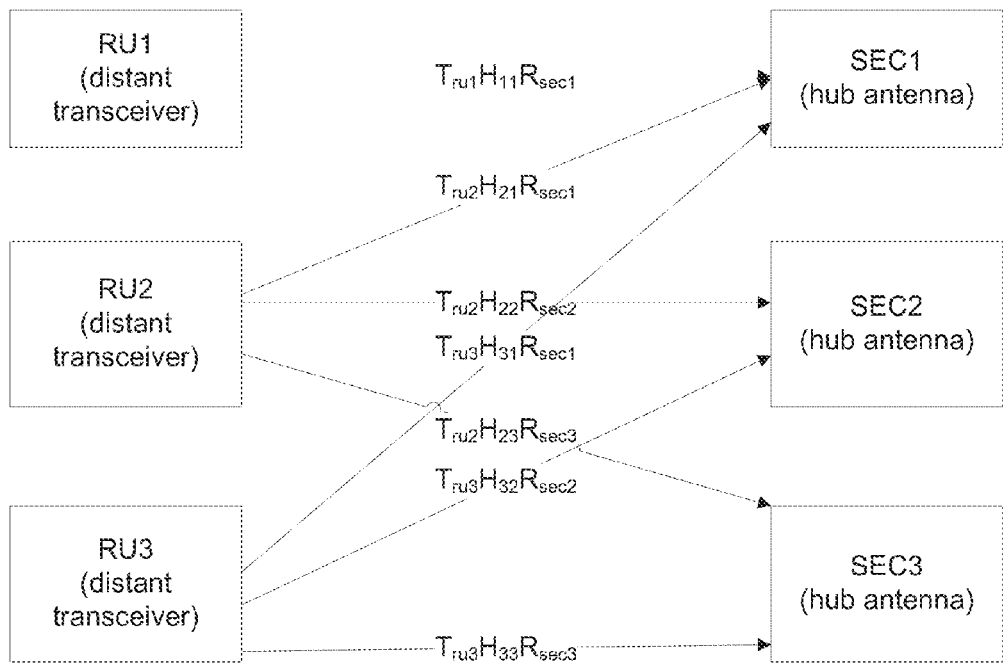
FIG. 6 is an exemplary diagram conceptually illustrating the setup of equations for desired signals from a distant transceiver to a corresponding multi-sector hub antenna, and removal of interference signals from other distant transceivers to the multi-sector hub antenna, in accordance with some embodiments of the present invention.

Reference is also made to FIG. 6, which is a diagram that conceptually illustrates the setup of equations for the desired signals from RU1 to SEC1 and removal of interfering signals from RU2 and RU3 to SEC1, in accordance with some embodiments of the present invention.

The desired signal from RU1 to SEC1 is denoted by Tru1H11Rsec1.

The interfering signal from RU2 to SEC1 (Tru2H21Rsec1) is cancelled by forming an equation with the other signals transmitted by RU2 and received by SEC2 (Tru2H22Rsec2) and SEC3 (Tru2H23Rsec3), the sum of the equation being approximately zero, for example, within a predefined tolerance range. Interference cancellation parameters (e.g., coefficients, weights) are applied to the signals received at SEC2 and SEC3 to obtain the relationship:

$$T_{ru2}H_{22}R_{sec\,1}w_{21r}+T_{ru2}H_{23}R_{sec\,3}w_{31r}=-T_{ru2}H_{21}R_{sec\,1}$$

The receiving weights may be calculated using one or more calculation methods, for example, by muting the desired transmission for short interval signals and minimization the received signals, assuming it is interference only. The minimization may be performed, for example, based on the LMS method, or by direct inversion of the covariance matrix according to the Wiener method. Optionally, another method is based on measuring the channel transfer function through known patterns in the transmission, such as preamble or pilots, or through performing blind channel estimation through known data aided detection.

The following equations describe a possible calculation of the weights based on channel estimation. The following equation may be useful for understanding the calibration method.

The above is rearranged to obtain equation 1:

$$w_{21r} = -\frac{H_{21}R_{sec1}}{H_{22}R_{sec2}} - \frac{H_{23}R_{sec3}}{H_{22}R_{sec2}}w_{31r} \qquad (1)$$

Similarly, another relationship is set up for signals transmitted by RU3:

$$T_{ru3}H_{32}R_{sec\,2}w_{21r}+T_{ru3}H_{33}R_{sec\,3}w_{31r}=-T_{ru3}H_{31}R_{sec\,1}$$

The above is rearranged to obtain equation 2:

$$w_{31r} = -\frac{H_{31}R_{sec1}}{H_{33}R_{sec3}} - \frac{H_{32}R_{sec2}}{H_{33}R_{sec3}}w_{21r} \qquad (2)$$

Substituting (2) into (1):

$$w_{21r} = -\frac{H_{21}R_{sec1}}{H_{22}R_{sec2}} - \frac{H_{23}R_{sec3}}{H_{22}R_{sec2}}\left(-\frac{H_{31}R_{sec1}}{H_{33}R_{sec3}} - \frac{H_{31}R_{sec2}}{H_{33}R_{sec3}}w_{21r}\right) \qquad (3)$$

$$w_{21r} = \frac{R_{sec1}}{R_{sec2}}\left(-\frac{H_{21}}{H_{22}} + \frac{H_{23}H_{31}}{H_{22}H_{33}}\right) + \frac{H_{23}H_{32}}{H_{22}H_{33}}w_{21r} = \qquad (4)$$

$$\frac{R_{sec1}}{R_{sec2}}\left(\frac{H_{23}H_{31} - H_{21}H_{33}}{H_{22}H_{33}}\right) + \frac{H_{23}H_{32}}{H_{22}H_{33}}w_{21r}$$

$$w_{21r} = \frac{\frac{R_{sec1}}{R_{sec2}}\left(\frac{H_{23}H_{31} - H_{21}H_{33}}{H_{22}H_{33}}\right)}{1 - \frac{H_{23}H_{32}}{H_{22}H_{33}}} = \frac{R_{sec1}}{R_{sec2}}\left(\frac{H_{23}H_{31} - H_{21}H_{33}}{H_{22}H_{33} - H_{23}H_{32}}\right) \qquad (5)$$

Optionally, the transfer function values to evaluate W21r using equation 5 have been determined, for example, measured and/or estimated at block 202. It is noted that evaluation of W21r is dependent on transfer functions at the multi-sector hub and the physical communication channels between the distant transceivers and multi-sector hub. The value of the transfer function at the distant transceivers may not be required. W31r may be evaluated using equation 2.

Optionally, receive interference cancellation parameters are applied to all signals sent by distant transceivers and received at all multi-sector hub antennas. Optionally, the application is performed simultaneously.

For illustration purposes, the exemplary equations relate to the arrangement of one multi-sector hub communicating with three distant transceivers. Equations may be derived for the arrangement of one multi-sector hub communicating with N distant transceivers, as shown, for example, by performing an induction process:

Substituting the $w_r$ values from the above for the general case: In the 3 distant transceiver case:

$$F_{ij} = \frac{w_{ijt}}{w_{jir}} = \frac{T_{sec\,i}R_{sec\,i}}{T_{sec\,j}R_{sec\,i}} \quad i = 1:3 \quad j = 1:3$$

Assuming:

$$F_{ij} = \frac{w_{ijt}}{w_{jir}} = \frac{T_{seci}R_{seci}}{T_{secj}R_{seci}} \quad i = 1:N \quad j = 1:N$$

is true

It may be proved:

$$F_{ij} = \frac{w_{ijt}}{w_{jir}} = \frac{T_{seci}R_{seci}}{T_{secj}R_{seci}} \quad i = 1:N+1 \quad j = 1:N+1$$

Referring now back to FIG. 2, at 212, the desired signals are isolated. Optionally, desired signals are isolated for each sector-multi-sector hub antenna pair.

Optionally, at 214, the isolated desired signals are forwarded. Optionally, the desired signals are sent to network 316 for routing.

Following transmit sub-flow chart 206 (e.g., downlink), signals are transmitted by the multi-sector hub to one of the distant transceivers.

At 216, signals for transmission by the multi-sector hub to one of the distant transceivers are received. Optionally, the signals are received from network 316.

At 218, one or more interference cancellation parameters are applied to the signals. Optionally, the signals are modified by the parameters before and/or during the transmission, so that signals are transmitted with the parameters. Optionally, parameters are applied by signal processing methods.

Based on the equations described above with reference to block 210, equations may also be developed for calculation of transmit interference cancellation parameters for cancelling interference by signals sent by one multi-sector hub antenna and received by non-corresponding distant transceivers.

In an exemplary calculation, transmit interference cancellation parameters (e.g., weights) are derived to cancel interference from SEC1 to RU3 and SEC1 to RU2:

$$w_{12t} = \frac{T_{sec1}}{T_{sec2}} \left( \frac{H_{32}H_{13} - H_{12}H_{33}}{H_{22}H_{33} - H_{32}H_{23}} \right) \quad (6)$$

Optionally, the same channel is used for transmitting and receiving, for example, using time division duplex (TDD), so that $H_{21}=H_{12}$, $H_{31}=H_{13}$, $H_{23}=H_{32}$.

Optionally, the transmit interference cancellation parameters are derived from the receive interference cancellation parameters (e.g., as described with reference to block 210). Optionally, a calibration factor relates transmit and receive interference cancellation parameters.

For example, the calibration factor F12 to calculate W12t from W21r may be denoted as:

$$w_{12t} = F_{12}w_{21r} \quad (7)$$

which may be rearranged to:

$$F_{12} = \frac{w_{12y}}{w_{21r}} = \frac{T_{sec1}R_{sec2}}{T_{sec2}R_{sec1}} \quad (8)$$

Alternatively, the transmit interference cancellation parameters are calculated directly, for example, using equation 6.

The calibration factor F may depend only on the hardware transmit and response (i.e., transfer functions) in the multi-sector hub.

Optionally, at 220, the signal is transmitted from the multi-sector hub to the sector.

Figure 7:
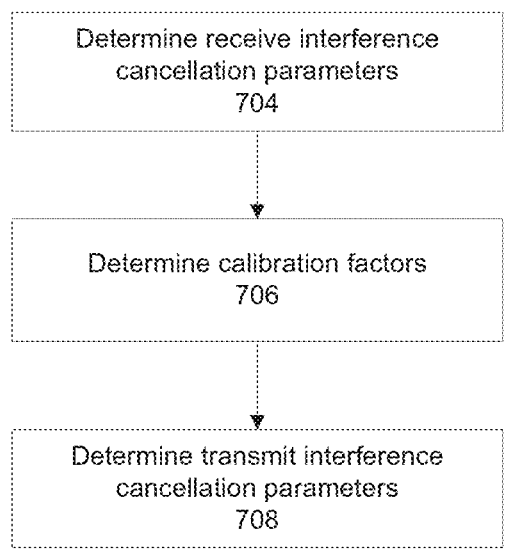
FIG. 7 is a flow chart of a computer-implemented method of calibration for interference cancellation, in accordance with some embodiments of the present invention.

Reference is now made to FIG. 7, which is flow chart of a computer-implemented method of calibrating for interference cancellations, in accordance with some embodiments of the present invention. Optionally, calibration may be performed, for example, by calibration module 324 of system 300, for example, as part of block 202 of FIG. 2.

Optionally, at 704, the receive interference cancellation parameters are determined. The receive interference cancellation parameters may be calculated and/or obtained, for example, using methods based on the LMS algorithm, Direct Matrix Inversion, zero forcing channel estimation, and/or other methods.

Optionally, at 706, the calibration factors for converting the receive interference cancellation parameters into the transmit interference cancellation parameters are evaluated. Optionally, different calibration factors are calculated, for example, for different frequency bins. The calibration factors may be denoted as:

$$F_{xy} = \frac{T_{secx}R_{secy}}{T_{secy}R_{secx}} \quad x \neq y$$

or $$w_{xyt} = w_{yxr}F_{xy}$$

wherein: $T_{sec}$ and $R_{sec}$ respectively denote the transfer functions of the transmitter and the receiver of the multi-sector hub.

Optionally, calibration factors Fxy are calculated by determining the ratios of the transceiver response of the multi-sector hub antennas.

Optionally, the calibration factors are determined by a computer-implemented calibration process. The process includes transmission and reception between the different antennas of the multi-sector hub.

Calculation of the calibration factors may be based on TDD channel reciprocity. The forward and reverse channels between antennas of the hub may be assumed to be equal.

Optionally, a defined signal is transmitted and received. The transfer function may be derived from the transmitted and received signals. The calibration factor may be derived based on the transfer functions.

For example, F21 the calibration factor for deriving W21t, may be derived by transmitting a predefined pilot symbol p1 from the antenna of hub-sector 1 to the antenna of hub-sector 2. The received signal is denoted as r2. A predefined pilot symbol p2 is transmitted from the antenna of hub-sector 2 to the antenna of sector 1.

The received signal is denoted as r1. Optionally, the transmitted signals p1 and p2 are the same. Alternatively, different signals are transmitted.

Optionally, the calibration process is repeated, for example, according to set time intervals, according to a user manually initiating the process, and/or according to detected changes.

Optionally, the process is repeated offline, for example, the system is shut down during regular operation (e.g., for several seconds) to perform the calibration. Alternatively, the calibration is performed during regular operation, for example, the transmission and receiving being interlaced with regular operation.

Figure 8:
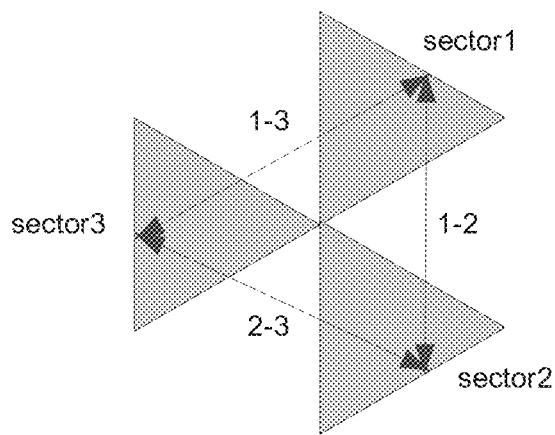
FIG. 8 is an exemplary antenna structure of multi-sector hub antennas, illustrating calibration signal transmit/receive links, in accordance with some embodiments of the present invention.

For a multi-sector hub communicating with three antennas (i.e., one for each sector), for example, as shown in FIG. 3, FIG. 8 is an exemplary antenna structure of the antennas of the multi-sector hub, illustrating the calibration signal transmit/receive links, in accordance with some embodiments of the present invention. Link 1-3 denotes the transmit/receive link between antennas 1 and 3, Link 1-2 denotes the transmit/receive link between antennas 1 and 2, Link 2-3 denotes the transmit/receive link between antennas 2 and 3.

Figure 9:
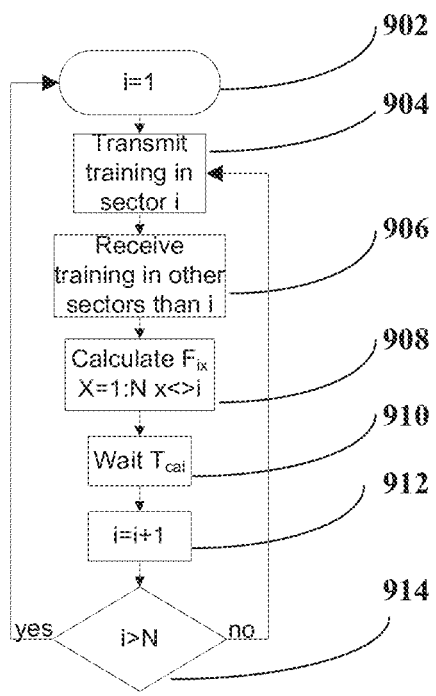
FIG. 9 is a flowchart of an exemplary computer-implemented method of deriving calibration factors for multi-sector hub antennas, in accordance with some embodiments of the present invention.

FIG. 9 is a flowchart of an exemplary computer-implemented method of deriving the calibration factors for all of the antennas of the multi-sector hub, in accordance with some embodiments of the present invention. The method may be used for an arrangement of a multi-sector hub having N antennas, for example, one antenna per sector for communication with a distant transceiver.

Figure 10:
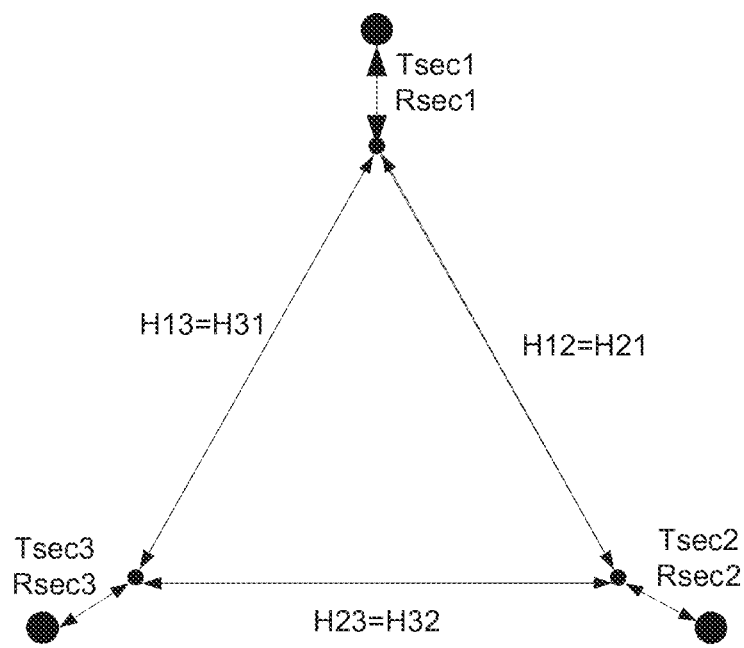
FIG. 10 is a canonic diagram of the calibration process of FIG. 9, in accordance with some embodiments of the present invention.

Reference is made to FIG. 10, which is a canonic diagram of the calibration process of FIG. 9, illustrated for the arrangement of a multi-sector hub with three antennas, in accordance with some embodiments of the present invention. As shown in FIG. 10, the channel transfer function between two multi-sector hub antennas may be the same in both directions. Transmit and receive elements of the antennas may be two separate components, or a single component.

In the process of FIG. 9, a predefined signal p is transmitted from each sector antenna to the other sector antennas. rxy denotes the received signal by sector antenna y when p is transmitted from sector antenna x. Optionally, the predefined signals are sequentially transmitted.

Optionally, at 902, a counter i is initialized, for example, to a value of 1.

At 904, signal p is transmitted by sector antenna i.

At 906, the transmitted signal p is received by the other antennas.

At 908, the calibration factors F are calculated for the transmit-received signals p and r between respective antennas. Fxy denotes the uplink-downlink weight calibration factor. Note that F may not be calculated for transmission-reception at the same antenna.

Optionally, at 910, a predefined rest period is provided. Signals may not be sent during this time. The rest period may allow signals and/or other charges on the antennas to dissipate. Subsequent signals may be transmitted and/or received more accurately.

Optionally, at 912, the counter i is incremented.

At 914, the process is repeated for all antennas. Each antenna may transmit signal p. Each antenna may receive a signal r from every other transmitting antenna.

Optionally, the signal level at the multi-sector hub transceivers is monitored and/or controlled, to avoid saturations. The calibration is performed among the antennas of the multi-sector hub, which may be close to one another. Signal levels may need to be adjusted to prevent saturation.

For the arrangement of one multi-sector hub with three antennas (e.g., as shown in FIG. 10), each antenna transmits once, for a total of three transmissions. The other two antennas receive the signals, for a total of six separate signal receptions. In total, 6 separate measurements are made. Optionally, the same signal p is transmitted each time. Received signals rxy are measured for each transmitted p. The measurements may be used to calculate the calibration factors Fxy using the equations:

$$\left.\begin{array}{l} r_{12} = pT_{sec1}R_{sec2}H_{12} \\ r_{21} = pT_{sec2}R_{sec2}H_{12} \end{array}\right\} F_{12} = r_{12}/r_{21}; F_{21} = r_{21}/r_{12}$$

$$\left.\begin{array}{l} r_{13} = pT_{sec1}R_{sec3}H_{13} \\ r_{31} = pT_{sec3}R_{sec1}H_{13} \end{array}\right\} F_{13} = r_{13}/r_{31}; F_{31} = r_{31}/r_{13}$$

$$\left.\begin{array}{l} r_{23} = pT_{sec2}R_{sec3}H_{23} \\ r_{32} = pT_{sec3}R_{sec2}H_{23} \end{array}\right\} F_{23} = r_{23}/r_{32}; F_{32} = r_{32}/r_{23}$$

If the same p is used for all transmissions, the equations may be generalized as:

$$\left.\begin{array}{l} r_{xy} = pT_{secx}R_{secy}H_{yx} \\ r_{yx} = pT_{secy}R_{secx}H_{xy} \end{array}\right\} F_{xy} = r_{xy}/r_{yx}; F_{yx} = r_{yx}/r_{xy}$$

Referring back to FIG. 7, at 708, the transmit interference cancellation parameters are determined. Optionally, transmit interference cancellation parameceters (e.g., weights) are derived from the receive interference cancellation parameters (e.g., weights). Optionally, the transmit interference cancellation parameters (e.g., downlink transmit weights) are calculated based on the received interference cancellation parameters (e.g., uplink receive weights) multiplied by the calibration factors (e.g., evaluated in block 706).

The calibration process of FIG. 7 may be used for an arrangement of multiple antennas in each sector, for example, MIMO. The calibration process may be conducted between each transmitter of each antenna of each sector to each receiver of each antenna in other sectors.

Referring back to FIG. 2, optionally at 222, system performance is monitored. Optionally, interference remaining after the interference cancellation process, is monitored. Interference may remain after interference cancellation, for example, due to changes in antenna alignment, severe weather (which may require higher transmit power), equipment changes, incorrect system configuration, or other factors.

Optionally, the calibration process is repeated when the remaining interference level has increased above a predefined threshold.

Optionally, the cancellation parameters are re-calculated, for example, by the calibration process of block 202. The re-calibration may reduce and/or remove the remaining interference.

It is expected that during the life of a patent maturing from this application many relevant data communication networks will be developed and the scope of the term data communication network is intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this present invention may be presented in a range format. It should be understood that the description in range format is merely for convenience and brevity and should not be construed as an inflexible limitation on the scope of the present invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the present invention, which are, for clarity, described in the context of separate embodiments, may also be provided in combination in a single embodiment. Conversely, various features of the present invention, which are, for brevity, described in the context of a single embodiment, may also be provided separately or in any suitable subcombination or as suitable in any other described embodiment of the present invention. Certain features described in the context of various embodiments are not to be considered essential features of those embodiments, unless the embodiment is inoperative without those elements.

Although the present invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computer-implemented method for calculating interference reducing parameters for cancelling wireless signal interference within a data communication network, the method being carried out by a calibration unit programmed to carry out the steps of the method, which comprise:
   per each of a plurality of antennas of a multi-sector hub communicating with a data communication network and with a corresponding transceiver of a plurality of distant transceivers:
      calculating a plurality of calibration factors based on values extracted from sequential transmission and reception of predetermined signals between each of the plurality of antennas of the multi-sector hub;
      calculating at least one receive interference cancellation parameter, to isolate desired signals transmitted by the corresponding distant transceiver from the undesired interference signals transmitted by other non-corresponding distant transceivers;
      calculating at least one transmit interference parameter for each non-corresponding antenna of the hub, based on the calculated receive interference cancellation parameters and the calibration factors; and
      generating the interference parameters for applying during operation of the multi-sector hub to generate interference cancellation signals.

2. The computer-implemented method of claim 1, wherein the at least one transmit interference cancellation parameters are calculated from the at least one receive interference cancellation parameters by the equations:

$$F_{xy} = \frac{T_{secx} R_{secy}}{T_{secy} R_{secx}} \quad x \neq y$$

$$w_{xyt} = w_{yxr} F_{xy}$$

wherein:
   $w_{xyt}$ denotes the transmit interference cancellation parameter for signals originating from antenna x and transmitted by antenna y;
   $w_{yxr}$ denotes the receive interference cancellation parameter for signals originating from distant transceiver y and received by antenna x;
   Fxy denotes the calibration factor relating $w_{xyt}$ and $w_{yxr}$;
   Tsecx denotes the transfer function of the transmitting components of antenna x; and
   Rsecy denotes the transfer function of the receiving components of antenna y.

3. The computer-implemented method of claim 1, further comprising performing a calibration process at the multi-sector hub for determining the calibration factors for calculating the transmit interference cancellation parameter from the received interference cancellation parameter.

4. The computer-implemented method of claim 3, wherein the calibration processes comprises:
   per each antenna of the multi-sector hub:
      transmitting a predefined signal from the respective antenna;
      receiving the transmitted predefined signal at other antennas; and
      calculating the calibration factors from relationships between the transmitted and received predetermined signals.

5. The computer-implemented method of claim 3, wherein the calibration factors are calculated using the equations:

$$\left. \begin{array}{l} r_{xy} = p T_{secx} R_{secy} H_{yx} \\ r_{yx} = p T_{secy} R_{secx} H_{xy} \end{array} \right\} F_{xv} = r_{xv}/r_{vx} ; F_{vx} = r_{vx}/r_{xv}$$

wherein:
   Fxy denotes the calibration factor;
   P denotes the transmitted predefined signal;
   $r_{xy}$, $r_{yx}$ denote the received predefined signal;
   Rsec denotes the transfer function of the receiving component of the antenna;

Tsec denotes the transfer function of the transmitting component of the antenna; and H denotes transfer functions of physical links between the different antennas.

6. The computer-implemented method of claim 3, wherein the calibration process is occasionally repeated during network operation to update the calibration factor.

7. The computer-implemented method of claim 3, wherein the calibration process is performed at the multi-sector hub independently of the distant transceivers.

8. The computer-implemented method of claim 3, further comprising monitoring a remaining interference level at the multi-sector hub, and repeating the calibration process when the remaining interference level has increased above a predefined threshold.

9. The computer-implemented method of claim 1, wherein there are three distant transceivers and three antennas of the multi-sector hub, the receive interference cancellation parameter for signals transmitted by the second distant transceiver and received by the first antenna, is denoted by $w_{21r}$ and calculated by the equation:

$$w_{21r} = \frac{R_{sec1}}{R_{sec2}} \left( \frac{H_{23}H_{31} - H_{21}H_{33}}{H_{22}H_{33} - H_{23}H_{32}} \right);$$

wherein:
Rsec denotes the transfer function of the receiving components of antenna 1 or 2; and
H denotes transfer functions of physical links between distant transceivers 2 or 3, and antennas 1 2 or 3.

10. A system for cancelling interference within a communication network comprising:
a multi-sector hub with a plurality of antennas for wireless communication;
a plurality of distant transceivers, the hub antennas and corresponding distant transceivers arranged to form wireless data communication links within a data communication network, wherein signals transmitted by the distant transceivers overlap so that each hub antenna receives signals from the corresponding distant transceiver and at least one non-corresponding distant transceivers, and wherein signals transmitted by the hub antennas overlap so that each distant transceiver receives signals from the corresponding hub antenna and at least one non-corresponding hub antennas;
a hardware processor in electrical communication with each multi-sector hub antenna;
a non-transitory memory having stored thereon program modules for instruction execution by the hardware processor, comprising:
modules for calibration:
a module for receiving from the data communication network, a desired signal for wireless transmission by the respective antenna of the multi-sector hub;
a module for calculating a plurality of calibration factors based on values extracted from transmission and reception of predetermined signals between each of the plurality of antennas of the multi-sector hub;
a module for calculating at least one receive interference cancellation parameter, to isolate desired signals transmitted by the corresponding distant transceiver from the un-desired interference signals transmitted by other non-corresponding distant transceivers;
a module for calculating at least one transmit interference parameter for each non-corresponding antenna of the hub, based on the calculated receive interference cancellation parameters and the calibration factors;
modules for operation:
a module for applying the calculated transmit interference cancellation parameters to the desired signal to generate interference cancellation signals for each of the other non-corresponding antennas; and
a module for transmitting the desired signal by the corresponding antenna, and transmitting each interference cancellation signal by each of the other non-corresponding antennas, so that signals received by distant transceivers cancel out to isolate the desired signal.

11. The system of claim 10, wherein all processing for interference cancellation is performed by the processor in electrical communication with the antennas of the multi-sector hub.

12. The system of claim 10, wherein wireless links between the distant transceivers and multi-sector hub antennas operate at the same frequency, or at adjacent frequencies.

13. The system of claim 10, wherein the calibration factor is calculated based on properties of the components of the respective multi-sector hub antennas.

14. The system of claim 10, further comprising one or more additional antennas per multi-sector hub, the plurality of antennas and distant transceivers arranged for multiple-input-multiple-output (MIMO) in a plurality of sectors, wherein signals generated by a subset of one or both of the plurality of antennas and distant transceivers interfere with each other, and wherein a module applies the calibration factors to cancel out signal interference between the plurality of antenna hubs and distant transceivers.

15. The system of claim 14, wherein a calibration process for determining calibration factors for calculating the transmit interference cancellation parameters from the receive interference cancellation parameters, is run between each transmission antenna and each receiving antenna that receives interfering signals from other transmission antennas.

16. The system of claim 10, further comprising one or more additional transceivers per distant transceiver, the hub antennas and plurality of distant transceivers arranged for multiple-input-multiple-output (MIMO) in a plurality of sectors, wherein signals generated by a subset of one or both of the plurality of antennas and distant transceivers interfere with each other, and wherein a module applies the calibration factors to cancel out signal interference between the plurality of antenna hubs and distant transceivers.

17. The system of claim 10, wherein the hub antennas and distant transceivers are arranged as sectors in a multi-point to single-point wireless backhaul for a Long Term Evolution (LTE) network.

18. The system of claim 10, wherein the hub antennas and distant transceivers are arranged as sectors in a multi-point to single-point wireless access network.

19. The system of claim 10, wherein interference cancellation is performed with N antennas of the multi-sector hub for N−1 distant transceiver interferers.

20. A computer-implemented method for cancelling wireless signal interference within a data communication network, the method being carried out by an interference cancellation unit programmed to carry out the steps of the method, which comprise:
per each of a plurality of antennas of a multi-sector hub communicating with a data communication network and with a corresponding transceiver of a plurality of distant transceivers:

receiving from the data communication network, a desired signal for wireless transmission by the respective antenna of the multi-sector hub;

applying transmit interference cancellation parameters to the desired signal to generate interference cancellation signals for each of the other non-corresponding antennas; and transmitting the desired signal by the corresponding antenna, and transmitting each interference cancellation signal by each of the other non-corresponding antennas, so that signals received by distant transceivers cancel out to isolate the desired signal;

wherein:

at least one transmit interference parameter for each non-corresponding antenna of the hub is based on receive interference cancellation parameters and calibration factors based on values extracted from sequential transmission and reception of predetermined signals between each of the plurality of antennas of the multi-sector hub, the receive interference cancellation parameters based on isolating desired signals transmitted by the corresponding distant transceiver from the un-desired interference signals transmitted by other non-corresponding distant transceivers.

21. The computer-implemented method of claim 20, further comprising:

receiving at the respective hub antenna desired signals transmitted by the corresponding distant transceiver of the plurality of distant transceivers and undesired signals interfering with the desired signals and transmitted by at least one other non-corresponding of the plurality of distant transceivers;

applying receive interference cancellation parameters to cancel the interference from the signals transmitted by the at least one other non-corresponding of the plurality of distant transceivers to isolate the desired signals from the undesired signals; and providing the isolated desired signals for transmission within the data communication network.

22. The computer-implemented method of claim 21, wherein each of the receive interference cancellation parameters are applied so that for each undesired signal transmitted by the other non-corresponding distant transceivers, and received by the plurality of hub antennas, the sum of the combination of the received signals having the applied receive interference cancellation parameters is minimized.

23. The computer-implemented method of claim 21, wherein the receive interference cancellation parameters are weights applied to the received signals.

* * * * *